No. 637,098. Patented Nov. 14, 1899.
C. ENDRUWEIT.
STUFFING BOX PACKING.
(Application filed Dec. 31, 1897.)

(No Model.)

Witnesses
E. W. Hart.
J. T. Richmond.

Inventor
Carl Endruweit
by G. Dithmar
his Attorney

UNITED STATES PATENT OFFICE.

CARL ENDRUWEIT, OF BERLIN, GERMANY.

STUFFING-BOX PACKING.

SPECIFICATION forming part of Letters Patent No. 637,098, dated November 14, 1899.

Application filed December 31, 1897. Serial No. 665,259. (No model.)

*To all whom it may concern:*

Be it known that I, CARL ENDRUWEIT, a subject of the Emperor of Germany, residing at Berlin, Germany, have invented certain new and useful Improvements in Stuffing-Box Packing; and I do hereby declare the following to be a full, clear, and exact description of the invention, such as will enable others skilled in the art to which it appertains to make and use the same.

The present invention relates to packings and particularly stuffing-box packings, the object being to provide an improved packing, as hereinafter described.

Besides rope, gasket, and hemp packings, metal is now also used for packings for stuffing-boxes, which, like the former, show a great many disadvantages, as on account of their rigidity they do not lie close enough to the part to be packed so as to avoid loss of power. In consequence of the high pressure exerted by the stuffing-box on present packings the packing is contracted with great force and is at the same time pressed against that part of the machine which is to be packed. Thereby an unproportionally high friction is produced by the rigidity of the packing, which originates between this and the adjoining part of the machine to be packed, which, in consequence of the slight lubrication that is only possible in this part and through the roughness which consequently arises in the movable machine part, is greatly enhanced.

The packing which forms the subject-matter of the present invention does away almost entirely with the above-named disadvantages and makes a continuous automatic lubrication of the parts packed in such a degree as no other packing. It is evident that by this means a considerable reduction of the friction between the machine element and the packing occurs, and consequently a considerable saving in power is effected.

Figure 2:
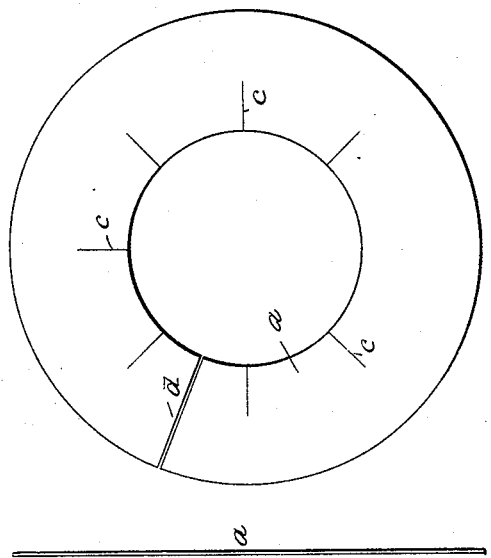
Figure 1:
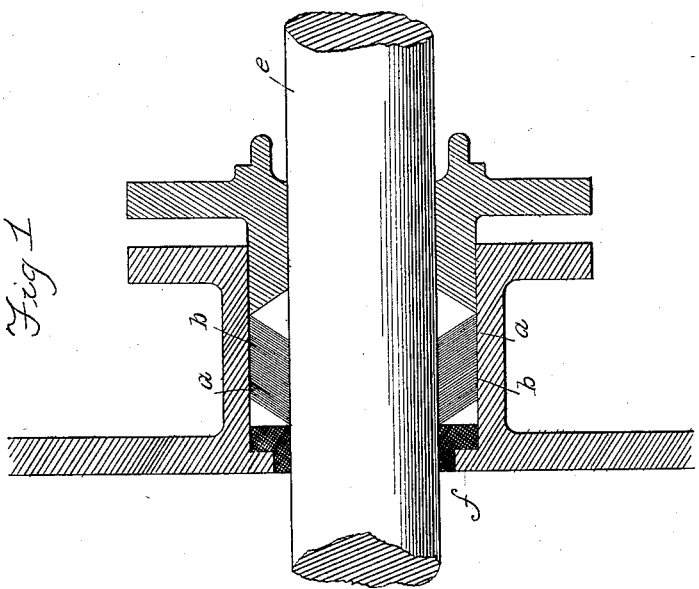

Referring to the drawings accompanying and forming a part of this specification, Figure 1 is a central longitudinal section through a stuffing-box with assembled incised metal rings forming the packing, showing the general arrangement of the latter. Fig. 2 shows in part a side view and in part a face view of my improved metal packing-rings.

It will be seen from the drawings that the present packing consists of very thin metal rings $a$, made of pure nickel and copper, (or I may employ nickel with a plating of copper,) which are piled together alternately with rings $b$ of paper or other non-metallic material. As shown in Fig. 2, the rings are split at $d$ for facility in assembling and have radial incisions $c$, whereby the packing is made to adapt itself to any inequalities in the rod $e$ as it reciprocates in the stuffing-box $f$. The metal ring $a$ may, if desired, be united in suitable manner with a ring of non-metallic material.

The metal rings $a$, being made of chemically-pure nickel or copper, are soft and elastic. They consequently lie close with their inner incised rims to any roughness on the surface of the machine part without injuring the latter in any way on account of their softness and pliability. Such injury results easily from other known metal packings on account of their rigidity.

The non-metallic layers $b$, placed alternately between the metal rings, serve the following purposes: First, they have the effect to make the compact mass considerably more elastic than if the latter were merely composed of metal rings of the hereinbefore-described kind. Second, they allow of an automatic uniform lubrication of the movable machine part from the cylinder—that is, even in the center of the packing oil is carried onto the machine part through the soft oil-absorbing layers between the metal rings, which does not take place in any other metal packing, as in the hitherto-known packings the oil will be found only quite in front or quite at the back of the packing. Third, they also reduce the transmission of the heat of the steam from the foremost ring which is exposed to such heat to the following layers of the packing, and thereby cause a condensation of the volatile oil-gases, thus effecting a considerable saving in lubricating material.

Having thus described my invention, what I claim is—

A stuffing-box packing, consisting of regularly-alternating split rings of chemically-pure thin nickel and copper provided with radial incisions on the inner rim, and an elastic non-metallic material, as paper, adapted to absorb lubricating substances and to prevent the transmittal of heat from one ring to another, whereby an automatic and continuous lubrication of the rod occurs, during its reciprocations, substantially as herein described.

In testimony whereof I affix my signature in presence of two witnesses.

CARL ENDRUWEIT.

Witnesses:
ALFRED BORN,
EMIL SCHÜTZE.